US011858233B2

(12) United States Patent
Adami et al.

(10) Patent No.: US 11,858,233 B2
(45) Date of Patent: Jan. 2, 2024

(54) METHOD AND DEVICE FOR CONTROLLING THE TRACTION OF CORRUGATED BOARD IN THE DOUBLE FACER OF A PRODUCTION LINE

(71) Applicant: Fosber S.p.A., Pescaglia (IT)

(72) Inventors: Mauro Adami, Viareggio (IT); Marco Imposti, Capannori (IT)

(73) Assignee: Fosber, S.p.A., Pescaglia (IT)

( * ) Notice: Subject to any disclaimer, the term of this patent is extended or adjusted under 35 U.S.C. 154(b) by 0 days.

(21) Appl. No.: 17/742,496

(22) Filed: May 12, 2022

(65) Prior Publication Data

US 2022/0266566 A1 Aug. 25, 2022

Related U.S. Application Data

(62) Division of application No. 16/857,593, filed on Apr. 24, 2020, now Pat. No. 11,420,409.

(30) Foreign Application Priority Data

May 6, 2019 (IT) ........................ 102019000006568

(51) Int. Cl.
*B31F 1/28* (2006.01)

(52) U.S. Cl.
CPC ............ *B31F 1/2804* (2013.01); *B31F 1/285* (2013.01); *B31F 1/2831* (2013.01); *B31F 1/2881* (2013.01)

(58) Field of Classification Search
CPC ........ B31F 1/20; B31F 1/2804; B31F 1/2813; B31F 1/2831; B31F 1/2845; B31F 1/2877; B31F 1/2881
See application file for complete search history.

(56) References Cited

U.S. PATENT DOCUMENTS

| | | | |
|---|---|---|---|
| 6,110,095 | A | 8/2000 | Finke et al. |
| 8,714,223 | B2 | 5/2014 | Adami et al. |
| 2012/0193026 | A1 | 8/2012 | Adami |
| 2018/0129793 | A1 | 5/2018 | Ulis et al. |
| 2019/0105866 | A1 | 4/2019 | Adami |

FOREIGN PATENT DOCUMENTS

| | | | |
|---|---|---|---|
| EP | 1362690 | A1 | 11/2003 |
| EP | 1491326 | A1 | 12/2004 |
| EP | 2484516 | A1 | 8/2012 |
| WO | 2019048437 | A1 | 3/2019 |

*Primary Examiner* — Chelsea E Stinson
(74) *Attorney, Agent, or Firm* — Breiner & Breiner, L.L.C.

(57) ABSTRACT

The method includes the step of pulling the corrugated board along hot plates by means of an upper flexible member and a lower flexible member driven by two electric motors. By at least one electric parameter of the drive motor of the lower flexible member, the correct operation of the traction device and in particular the correct ratio of the linear feeding speeds of the two flexible members is checked. The method provides an iterative check of the controlled electric parameter and a possible correction of the speed of the flexible members to maintain the desired speed ratio.

10 Claims, 5 Drawing Sheets

METHOD AND DEVICE FOR CONTROLLING THE TRACTION OF CORRUGATED BOARD IN THE DOUBLE FACER OF A PRODUCTION LINE

RELATED APPLICATION

This application is a division of U.S. patent application Ser. No. 16/857,593 filed Apr. 24, 2020, which is incorporated herein by reference.

DESCRIPTION

Technical Field

The present invention relates to plants for the production of corrugated board and the related methods. More particularly, the invention relates to improvements to the so-called double facer for the production of corrugated board and to the methods for their control.

BACKGROUND ART

Corrugated board is produced continuously by bonding two or more sheets of paper unwound from respective reels. In general, a sheet of corrugated board comprises at least one sheet of corrugated paper glued between two sheets of smooth paper, also called liners. The corrugated board production lines comprise a plurality of unwinding stations which feed the sheets of paper to the machines of the line. Two sheets of smooth paper coming from two reels are fed to a so-called corrugator, which deforms one of the two sheets of paper to make a plurality of flutes therein and bonds a second sheet of smooth paper to the first sheet of corrugated paper by gluing, thus obtaining a simple corrugated board. Examples of corrugators are described in EP1362690; US20120193026; U.S. Pat. No. 8,714,223; and US20190105866.

The simple corrugated board sheet is fed to a so-called double facer, together with at least a third sheet of smooth paper, which is glued to the corrugated board sheet. In some cases several sheets of simple corrugated board are fed in parallel and together with an additional sheet of smooth paper, to form a multiple corrugated board, with two smooth outer liners and a plurality of sheets of corrugated paper and at least one intermediate sheet of smooth paper between said two liners. Examples of double facers are disclosed in US20120193026; EP2484516; EP1491326.

In general, the double facer comprises a heating section comprising a series of hot plates arranged in sequence along a path for the advancement of a continuous strip of corrugated board. The hot plates are usually heated by means of a heat transfer fluid, for example steam. Downstream of the heating section there is a cold traction section. The path of the corrugated board extends along the heating section and the cold traction section and it first advances through the heating section upstream and then through the cold traction section downstream.

The double facer also comprises a flexible upper member extending along the heating section and along the cold traction section. The flexible member is pressed against the hot plates by pressure members which are placed along the active branch of the upper flexible member, on the side thereof opposite in the one in contact with the corrugated board which slides on the hot plates. The pressure members ensure that the corrugated board is kept in close sliding contact with the upper surface of the hot plates.

A lower flexible member extends downstream of the heating section along the cold traction section. The upper flexible member and the lower flexible member are pressed towards each other to hold the continuous strip of corrugated board therebetween and to pull it along the advancement path. For this purpose, machines of the current art normally include a drive motor, with a mechanical connection which transmits motion to the upper and lower flexible members.

Due to the different length and the different stresses to which they are subjected, the upper and lower flexible members wear differently from each other. More particularly, the upper flexible member has faster wear than the lower flexible member.

The rollers around which the upper and lower flexible members are entrained are coated with a wearable material, for example made of silicone rubber. This coating is also subject to wear. The upper flexible member is longer than the lower flexible member and provides a power for the advancement of the corrugated board strip which is about three or four times greater than the power provided by the lower flexible member. This results in faster wear of the upper flexible member than the lower flexible member.

Usually, to ensure adequate traction of the corrugated board strip, the lower flexible member is controlled at a speed slightly higher than the speed of the upper flexible member. In the present context, the speed of the flexible members is defined as their linear velocity.

However, since the wear of the mechanical guide members (rollers) and of the flexible members themselves are different between the upper flexible member and the lower flexible member, when the actuation of these flexible members is assigned to a single motor, the initially set speed difference tends to change. In particular, since the upper flexible member wears faster than the lower flexible member, the difference in speed increases over time. In particular, the diameter of the motorized roller of the upper flexible member and the thickness of the latter decrease more rapidly than the diameter of the motorized roller of the lower flexible member and the thickness thereof. This results in a slowing down of the upper flexible member with respect to the lower flexible member.

When the difference between the two feed speeds begins to increase excessively, undesired tensions are generated in the corrugated board strip, in particular a shear stress which tends to cause mutual sliding between the two opposite liners. This can result in wrinkling, peeling off of the sheets that form the corrugated board, or breaking of the board.

To solve these problems, a double facer with two independent motors has been designed, a first motor for the lower flexible member and a second motor for the upper flexible member. This allows adjusting the difference in speed between the two upper and lower flexible members during the useful life thereof.

However, it has been found that this adjustment is very difficult in practice, because it is necessary to detect the speeds of the upper flexible member and the lower flexible member, for example through strobe lights or contact meter counters. These measurements are difficult and can be dangerous for operators. For these reasons, these measures are often omitted or carried out only after production problems and board production defects have arisen.

It would therefore be useful to have a new and more efficient method for controlling the stresses exerted by the flexible members on the corrugated board strip in the double facer and a better way of adjusting the advancement speeds thereof.

SUMMARY

To solve or alleviate the problems of the prior art, a method is provided for the advancement of a continuous strip of corrugated board along the double facer, wherein the corrugated board is towed along the hot plates of the double facer by means of an upper flexible member and a lower flexible member. The upper flexible member and the lower flexible member are pressed against each other and keep the corrugated board gripped therebetween. The lower flexible member is driven by a first electric motor and the upper flexible member is driven by a second electric motor. The upper flexible member extends along the heating section and along the cold traction section of the double facer. The lower flexible member is arranged in the cold traction section, downstream of the hot plates of the heating section.

In the present description and in the appended claims, the terms "upper" and "lower" are meant to refer to the position taken by the respective components when the line is assembled and in operational setup.

The method further comprises the step of checking at least a first electric parameter of at least one of said first electric motor and second electric motor, and the step of modifying the speed of at least one of the electric motors with respect to the speed of the other electric motor based on at least said first electric parameter, to maintain a desired ratio between the speed of the upper flexible member and of the lower flexible member within a predetermined range.

Advantageously, it can be provided that the step of checking the electric parameter is performed iteratively and that the correction or modification of the speed of the electric motor is carried out in real time. In the present context, execution in real time means an intervention on the controlled parameter (in this specific case the motor speed) as a step integrated in an iterative control loop, such that each verification of a discrepancy between the desired value and the real value is followed by a correction of the controlled parameter.

In practical embodiments, the second electric motor is a master motor and the speed thereof is imposed by the overall speed of the line. In this case, suitably, the above mentioned steps of the method described herein provide for intervening on the speed of the first electric motor and then modulating the linear speed of the lower flexible member, to maintain the speed of the latter at the desired value with respect to the linear advancement speed of the upper flexible member.

In advantageous embodiments, the first electric parameter is a parameter of the first electric motor. In advantageous embodiments, this first electric parameter is a function of the power absorbed by the first electric motor. For example, the first electric parameter can be the current absorbed by the first electric motor. In other embodiments, the first electric parameter may be the power absorbed by the first electric motor.

Advantageously, the method may comprise the step of comparing the current absorbed by the first electric motor with a maximum admissible current value. If the current absorbed by the first electric motor is higher than the maximum admissible current value, the method may provide the step of reducing the advancement speed of the lower flexible member with respect to the advancement speed of the upper flexible member.

The possibility of using other electric parameters, as a function of the power absorbed by the first electric motor, is not excluded.

In advantageous embodiments, the method may comprise a further control loop, which controls whether the lower flexible member is advancing at an excessively low speed with respect to the upper flexible member. For example, the following steps may be provided: if the current absorbed by the first electric motor is equal to or less than the maximum admissible current value, comparing the current absorbed by the first electric motor with a minimum admissible current value; if the current absorbed by the first electric motor is lower than the minimum admissible current value, increasing the speed of the lower flexible member with respect to the speed of the upper flexible member. In this way, the lower flexible member is prevented from moving at too low speed with respect to the upper flexible member, even without being dragged by the upper flexible member, a condition in which the first motor would operate in electric generator mode.

In certain embodiments, the method may comprise the step of verifying whether the speed of the lower flexible member is less than the speed of the upper flexible member. If such an event occurs, the step may be provided of modifying the speeds of the lower flexible member and the upper flexible member, and typically increasing the speed of the first electric motor to increase the speed of the lower flexible member, until the speed of the lower flexible member becomes equal to or greater than the speed of the upper flexible member.

In advantageous embodiments, in order to check whether the speed of the lower flexible member is lower than that of the upper flexible member, it may be provided to verify whether the first electric motor operates in electric generator mode, since this condition is indicative of the fact that first electric motor is driven in rotation by the upper flexible member. This operating condition may be detected by means of an electric parameter of the first electric motor, and in particular for example by means of the DC Bus voltage of the drive of the first electric motor.

According to an aspect, an object of the present invention is also a method for controlling the advancement of a continuous strip of corrugated board along the double facer of a production line, comprising a heating section with a plurality of hot plates and a cold traction section, placed downstream of the heating section; the method comprising the following steps:

a) pressing the corrugated board on an upper surface of the hot plates by means of an upper flexible member and pressure members;
b) pulling the corrugated board along the hot plates by means of the upper flexible member and a lower flexible member; the upper flexible member and the lower flexible member being pressed against each other and holding the corrugated board gripped therebetween; the lower flexible member being driven by a first electric motor and the upper flexible member being driven by a second electric motor; the upper flexible member extending along the heating section and along the cold traction section; and the lower flexible member being arranged in the cold traction section;
c) verifying, by means of a first electric parameter of at least one of said first electric motor and second electric motor, whether the lower flexible member advances at a lower speed than the upper flexible member;
d) if the lower flexible member advances at a lower speed than the upper flexible member, increasing the speed of the lower flexible member with respect to the speed of the upper flexible member;
e) by means of a second electric parameter of at least one of said first electric motor and second electric motor, verifying whether the speed of the lower flexible member is too high with respect to the speed of the upper flexible member;

f) if the speed of the lower flexible member is too high with respect to the speed of the upper flexible member, reducing the speed of the lower flexible member with respect to the speed of the upper flexible member;

g) by means of said second electric parameter, verifying whether the speed of the lower flexible member is too low with respect to the speed of the upper flexible member;

h) if the speed of the lower flexible member is too low with respect to the upper flexible member, increasing the speed of the lower flexible member with respect to the speed of the upper flexible member.

Further advantageous features and embodiments of the method and of the double facer are described below with reference to the accompanying drawings and in the claims.

An object of the present invention is also a memory medium containing a program which, when executed by a control unit, carries out the method described above.

An object of the present invention is also a production line of corrugated board, and more particularly a double facer of a production line of corrugated board, adapted to carry out the method defined above.

BRIEF DESCRIPTION OF THE DRAWINGS

The invention will be better understood by following the description and the accompanying drawings, which illustrate an exemplifying and non-limiting embodiment of the invention. More particularly, in the drawings.

DETAILED DESCRIPTION

Figure 1:
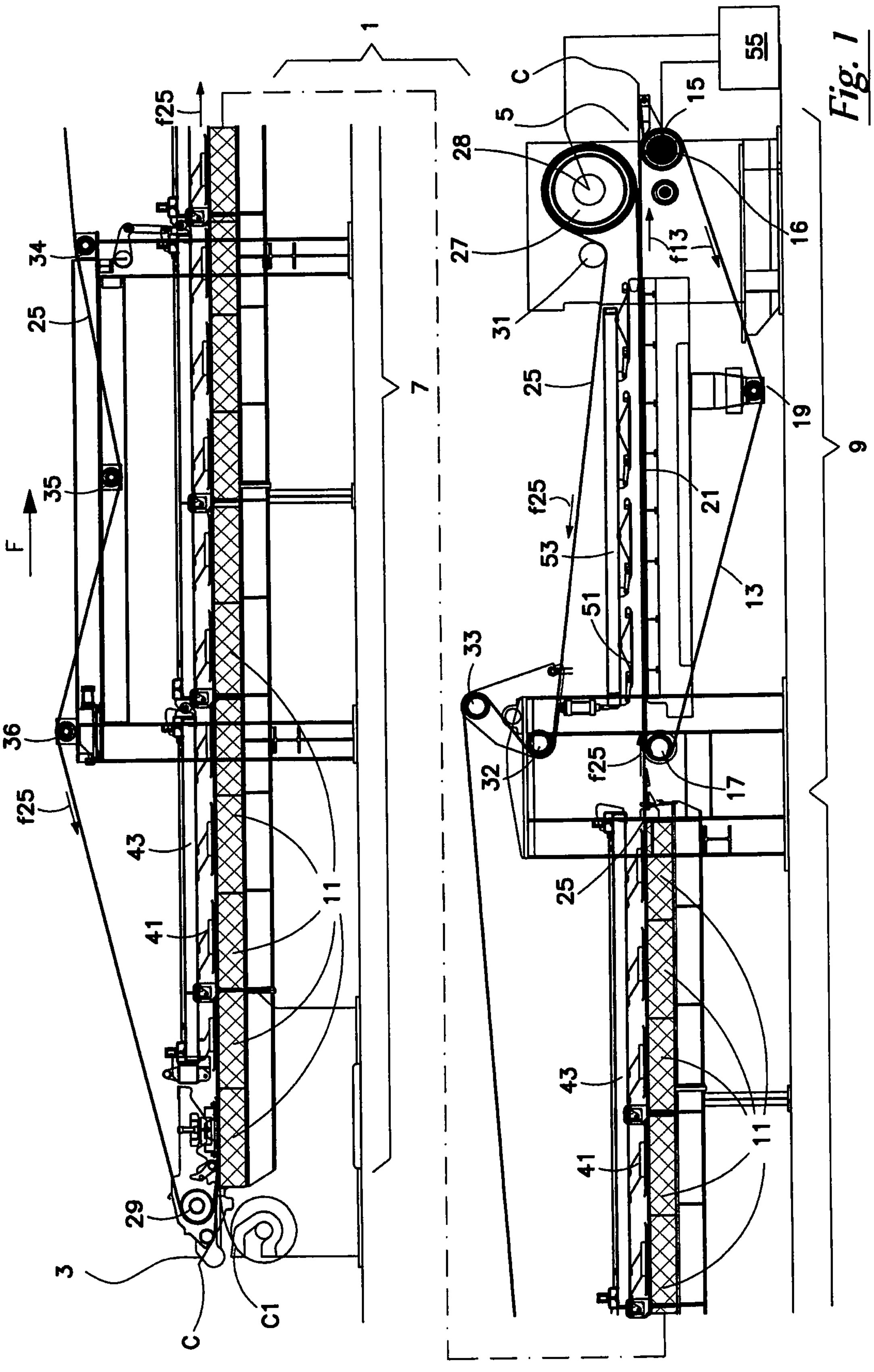
FIG. 1 the section of a corrugated board production line comprising the double facer.

FIG. 1 shows a diagram of a portion of a corrugated board production line, in which the double facer, indicated as a whole by reference numeral 1, is arranged. The structure of the double facer is known per se and therefore the main components thereof useful for understanding the invention will be referred to in the present description.

The double facer section has an inlet 3 and an outlet 5. Reference F indicates the direction of advancement of the continuous strip of corrugated board C through the double facer 1. The double facer comprises a heating section 7 and a cold traction section 9.

The heating section 7 comprises a plurality of hot plates 11 arranged in sequence along the advancement path of the corrugated board C. Each hot plate 11 is heated to a suitable temperature, for example by means of a heat transfer fluid. In some cases, the heat transfer fluid is steam.

The traction section 9 comprises a lower flexible member 13, for example consisting of a suitably motorized continuous belt. Reference f13 indicates the direction of advancement of the lower flexible member 13. In some embodiments, the lower flexible member 13 is guided around rollers

15, 17, 19. One of these rollers is motorized. In the example shown, the motorized roller is roller 15. Reference 16 schematically indicates a first electric motor for driving the roller 15 and therefore the lower flexible member 13. The upper branch of the lower flexible member 13 advances in contact with a support plate 21, which extends between the guide roller 17 and the motorized roller 15. Along the active branch of the lower flexible member 13, its inner surface is in sliding contact with the support plate 21, while the outer surface of the lower flexible member 13 is in contact with the corrugated board C. By inner surface of a continuous flexible member it is meant the one facing the inside of the closed path along which the flexible member moves, while by outer surface it is meant the one facing the outside of the closed path. As will be clarified below, the lower flexible member helps to pull the corrugated board C through the heating section 7 and the cold traction section 9. The friction between corrugated board C and lower flexible member 13 transmits a dragging force from the lower flexible member 13 to the corrugated board C.

As can be seen in FIG. 1, the lower flexible member 13 extends downstream of the heating section 7, and therefore downstream of the hot plates 11, to the outlet 5 of the double facer 1.

An upper flexible member 25 extends along all the double facer, preferably from the inlet 3 to the outlet 5, and therefore both through the heating section 7 and through the cold traction section 9. Reference f25 indicates the direction of advancement of the upper flexible member 25 which, similarly to the lower flexible member 13, may consist of a continuous belt. The upper flexible member 25 is guided around a plurality of rollers, at least one of which is motorized. In the illustrated example, the upper flexible member 25 is guided around a motorized roller 27, located at the outlet 5. Reference 28 schematically indicates a second electric motor which drives the motorized roller 27 and advances the upper flexible member 25. Reference 29 indicates a guide roller of the upper flexible member 25 located at the inlet 3 of the double facer 1. An active branch of the upper flexible member 25 extends between the rollers 29 and 27, parallel to the hot plates 11 and parallel to the support plate 21. The return branch of the upper flexible member 25 is guided around a series of guide rollers 31, 32, 33, 34, 35, 36.

Along the active branch of the upper flexible member 25, the outer surface thereof is in contact with the upper surface of the corrugated board C, to transmit (by friction) a traction force. Along the same active branch, the inner surface of the upper flexible member 25 advances in contact with pressure members 41 carried by a stationary bearing structure 43, placed above the hot plates 11. The pressure members 41 are adapted to press the active branch of the upper flexible member 25 against the corrugated board C, so as to guarantee a sufficient friction force between the corrugated board C and the upper flexible member 25. Furthermore, the pressure of the pressure elements 41 ensures the contact of the board C on the upper surface of the hot plates 11, so as to achieve correct heating of the corrugated board C. The pressure and the heating cause the smooth and corrugated sheets of paper, which form the corrugated board C, to glue together by virtue of adhesive applied on the crests of the corrugated sheets before entering the double facer 1, in a per se known manner. The large mutual contact surface between corrugated board C, hot plates 11 and upper flexible member 25 ensures that the pressure is relatively low and in any case such as not to cause crushing of the corrugated board. The length of the hot plates 11 and the advancement speed are selected in such a way as to ensure a contact time between corrugated board C and hot plates 11 sufficient to obtain gluing.

In the cold traction section 9 the lower branch of the upper flexible member 25 is pressed against the corrugated board C and against the upper branch of the lower continuous flexible member 13, which slides on the stationary contrast surface. In this way, the corrugated board C is retained between the two active branches of the upper flexible member 25 and of the lower flexible member 13, and is effectively dragged forward according to the arrow F to the outlet 5 of the double facer. The pressure of the upper flexible member 25 against the lower flexible member 13, against the corrugated board C and against the support plate 21 is ensured, for example, by pressure members 51 mounted on a bearing structure 53 in the cold traction section.

The upper flexible member 25 is much longer than the lower flexible member 13 and provides most of the traction force to the corrugated board C, required to overcome the friction thereof on the surfaces of the hot plates 11. The power supplied by the second electric motor 28 is approximately three to four times greater than the power supplied by the first electric motor 16.

The greater length and the greater stresses, also thermal, to which the upper flexible member 25 is subjected, cause wear of the latter which is faster than the wear of the lower flexible member 13. Wear leads to thinning of the flexible parts.

The guide rollers, and in particular the drive rollers 15, 27, also undergo different wear. In particular, the upper drive roller 27 wears faster than the lower drive roller 15. Wear affects the coating, typically in silicone rubber, of the drive rollers and therefore causes a reduction in their diameter.

Consequently, if the rotation speed of the electric motors 16 and 28 remains constant, wear causes a reduction in the linear speed of the upper and lower flexible members 25 and 13. Since the wear of the two flexible members and the respective rollers are different, this entails a different variation in the linear speed of the flexible members.

Typically, when the double facer is started with new flexible members, a small difference is set between the advancement speeds (i.e. the linear speeds) of the two flexible members 25, 13, for example a difference typically less than 1% between the linear advancement speed V13 of the lower flexible member 13 and the linear advancement speed V25 of the upper flexible member 25, with the lower flexible member 13 faster than the upper flexible member 25.

Figure 2:
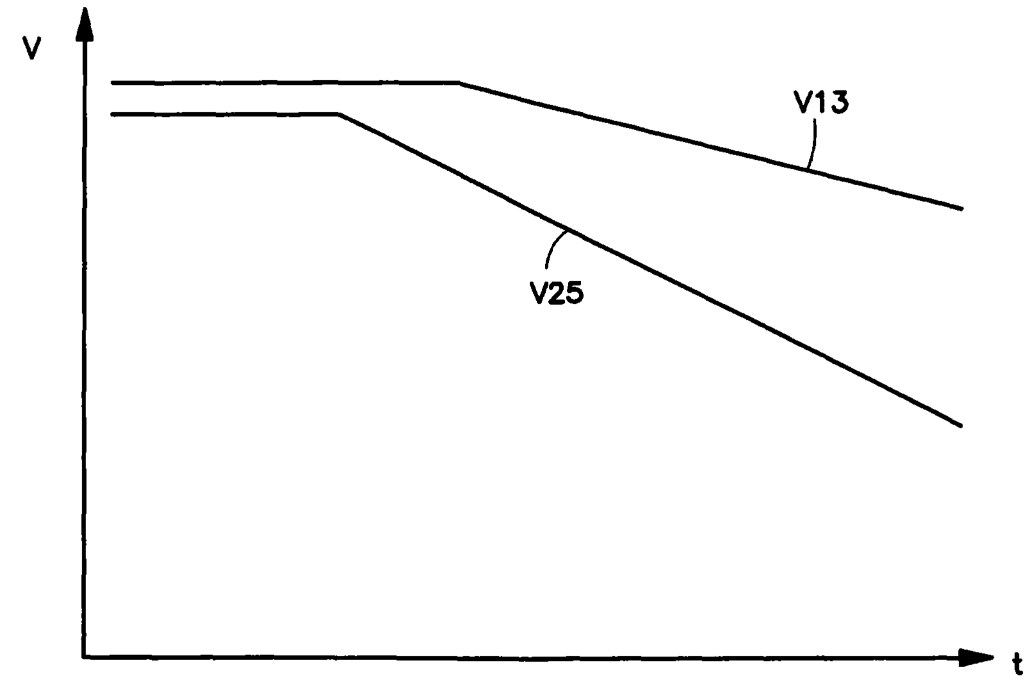
FIGS. 2 and 3 linear speed diagrams of the flexible traction members of the corrugated board.
Figure 3:
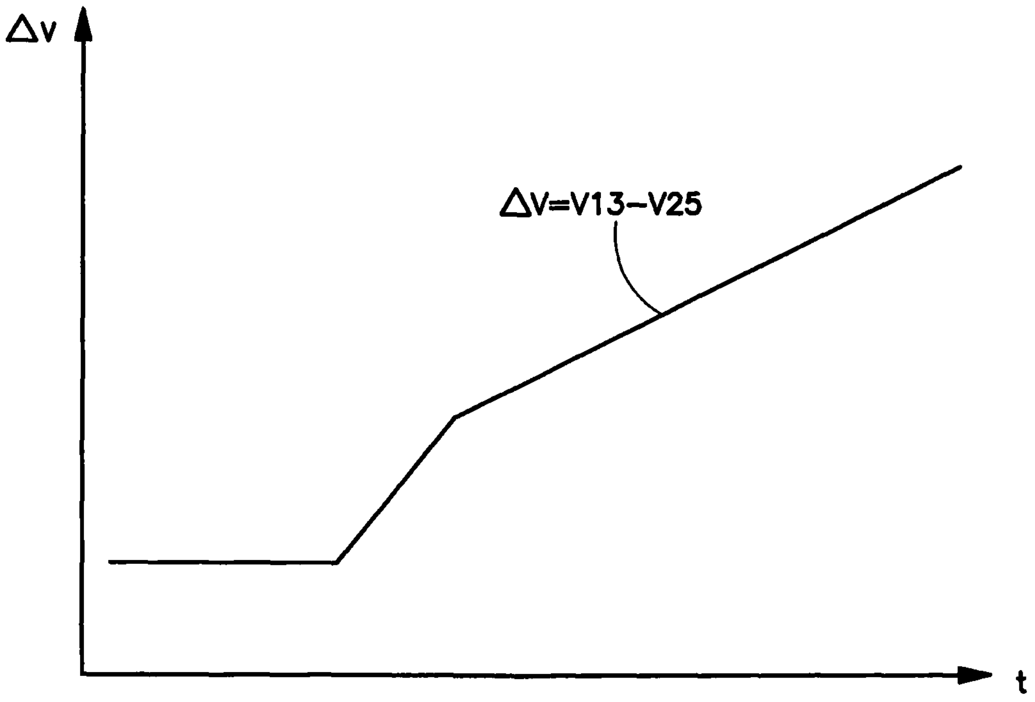

Due to the aforementioned effects of differential wear of the flexible members and of the respective motorized rollers, the difference between the linear speeds tends to vary over time and tends to increase. FIGS. 2 and 3 illustrate this situation. FIG. 2 illustrates a diagram showing the time on the abscissa and the linear speed of the continuous flexible members 13 and 25 on the ordinate, in the absence of corrections. Reference V25 indicates the linear speed of the upper flexible member 25; V13 indicates the linear speed of the lower flexible member 13, with the rotation speed of the respective electric motors 28 and 16 constant. FIG. 3 shows the difference ΔV=(V13−V25) between the two speeds as a function of time t. As can be seen from these two graphs, the above mentioned phenomena of differential wear between the two upper and lower flexible members cause an increase in the difference in speed.

Different situations from that illustrated in FIGS. 2 and 3 of gradual increase of the speed difference may also arise, with faster slowing down of the upper flexible member 25. For example, an abrupt change in the speed of one of the two flexible members 13, 25 may occur. This can happen when one of the two flexible members is replaced. For example, if the worn upper flexible member 25 is replaced with a new one, there is a sharp increase in its linear speed, a circumstance which the control system must take into account in order to make the traction system of the corrugated board C work correctly again.

Figure 4:
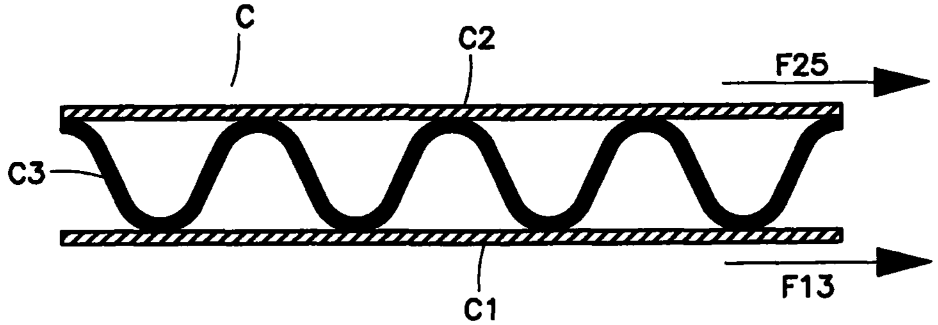
FIGS. 4, 5A and 5B illustrative diagrams of the traction forces of the continuous flexible members on the corrugated board in different operating conditions.
Figure 5A:
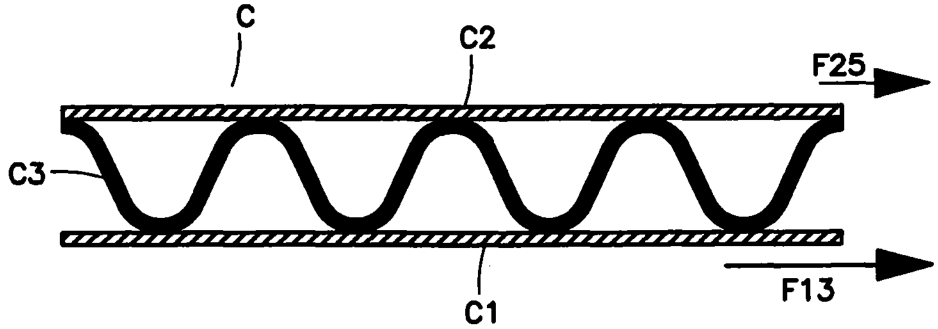
Figure 5B:
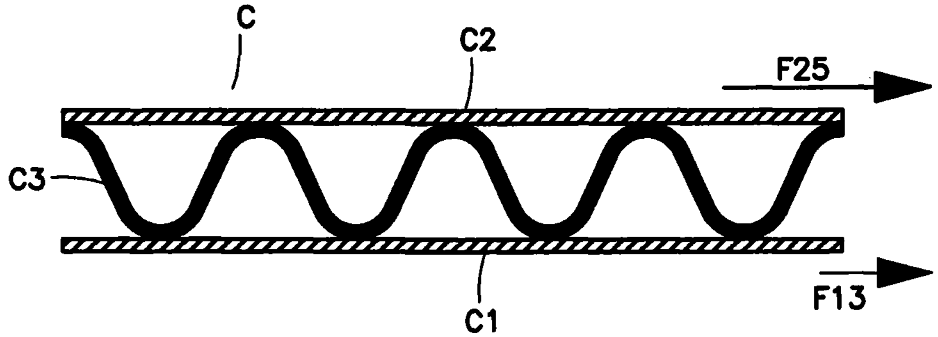

The variation in the difference between the two linear speeds of the two upper 25 and lower 13 flexible members causes inadmissible tensions on the corrugated board. This is clarified by the diagrams in FIGS. 4, 5A and 5B, which show in a simplified manner a portion of corrugated board C with single flute, comprising a lower liner C1, an upper liner C2 and an intermediate corrugated sheet C3. In both figures, F25 indicates the traction force applied by the upper flexible member 25 and F13 indicates the traction force applied by the lower flexible member 13. FIG. 4 shows the correct operating condition. Both the upper flexible member 25 and lower flexible member 13 exert a traction in the advancement direction F of the board. With increased speed difference between the upper flexible member 25 and the lower flexible member 13, situations of the type illustrated in FIG. 5A or 5B may occur. In FIG. 5A the speed of the upper flexible member 25 is too low and generates a force F25 lower than necessary on the corrugated board. This is the situation that typically occurs due to the faster wear of the upper flexible member 25. In FIG. 5B, the speed of the upper flexible member 25 is excessive compared to that of the lower flexible member 13. This can occur, for example, following the replacement of the upper flexible member 25. The anomalous situations of FIGS. 5A and 5B generate tensions in the corrugated board, causing defects or even breaks in the corrugated board C.

In order to alleviate or avoid this problem, one or more electric parameters of at least one of the electric motors 16, 28 are controlled, for example via a control unit 55, and these electric parameters are used to implement a control method which maintains the linear speed difference between the lower flexible member 13 and the upper flexible member 25 within an acceptable tolerance range.

In practical embodiments, the second electric motor 28, which has a power typically multiple than that of the first electric motor 16, is used as a master, i.e. its rotation speed is kept at a value that corresponds to the line speed. This speed may vary according to the conditions of the production line. The first electric motor 16 is controlled as a slave, i.e. the rotation speed thereof is modulated so as to maintain the desired small difference in linear speed between the two upper (slower) flexible member 25 and lower 13 (faster) flexible members.

The mechanical power that the electric motor must develop to advance the corrugated board depends on the resisting force that must be overcome to drag the corrugated board C. Therefore, when a situation of the type represented in FIG. 5 occurs, the resisting force F25 increases the electric power absorbed by the first electric motor 16 to develop the mechanical power necessary to drag the corrugated board. This increase in absorbed electric power is detectable as an increase in the current absorbed by the motor.

Therefore, by controlling the current I absorbed by the first electric motor 16 as an electric parameter and by acting with a control loop on the rotation speed of the first electric motor 16 to maintain the current absorbed around a desired value, it is possible to offset the effect of the difference of wear described above and prevent the linear speed of the lower flexible member 13 from becoming too high with respect to the linear speed of the upper flexible member 25.

The method can be further improved by controlling a further electric parameter to prevent the first electric motor 16 from rotating at such a speed as to advance the lower flexible member 13 at a linear speed V13 too low with respect to the linear speed V25 of the upper flexible member 25. If the linear speed of the upper flexible member 25 exceeds that of the lower flexible member 13, the first electric motor 16 would tend to be driven in rotation by the second electric motor 25. The onset of this circumstance can be detected electrically. For example, it is possible to use the DC voltage on the power bus (DC Bus voltage of the drive) of the first electric motor 16 as the second electric control parameter. The increase in this voltage indicates that the first electric motor 16 is operating in generator mode, that is, it is being dragged instead of contributing to the traction of the corrugated board C.

Figure 6:
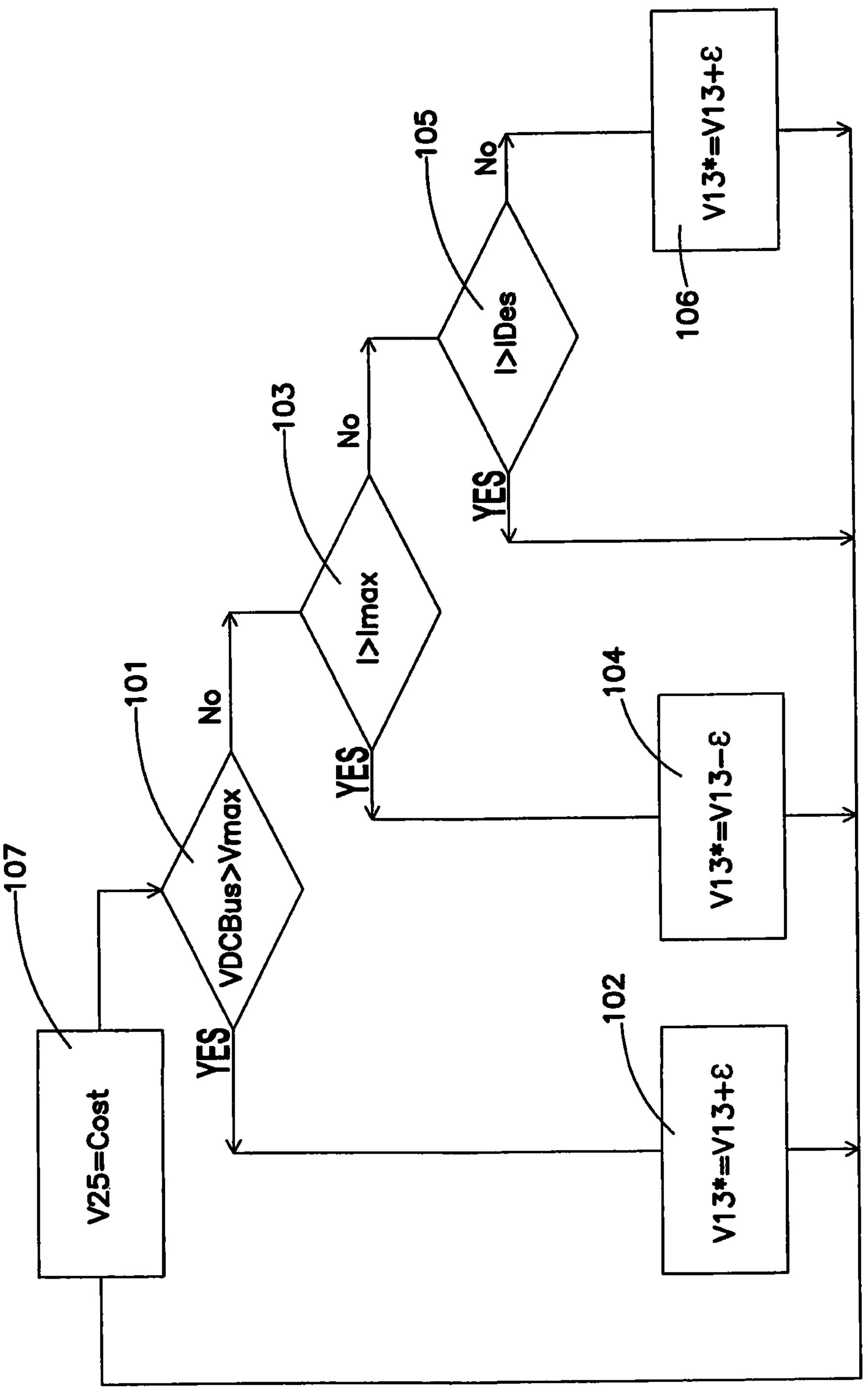
FIG. 6 a block diagram of the control method in one embodiment.

The diagram in FIG. 6 illustrates the method for controlling the rotation speed of the first electric motor 16 so as to maintain the linear speed of the lower flexible member 15 to the correct value (slightly higher) with respect to the linear speed of the upper flexible member 25, corresponding to the speed of the production line.

With reference to FIG. 6, the method comprises the following steps which are repeated in an iterative manner. In block 101 it is checked whether the value of the DC bus voltage of the drive of the first electric motor 16 (VDCBus) is higher than a maximum voltage VMax. Exceeding this maximum voltage value indicates an abnormal operation of the first electric motor 16 in generator mode and therefore that the speed of the lower flexible member 13 is too low. If this occurs, by executing block 102, the speed V13 of the lower flexible member 13 is increased, with an increase c which can be fixed or variable according to the difference between VDCBus and VMax.

If the check in block 101 gives a positive result (VDCBus≤Vmax), the check on the current I absorbed by the first electric motor 16 is performed in block 103. The current value is compared with a maximum threshold IMax. If the current absorbed by the first electric motor 16 is greater than the maximum allowed threshold, block 104 is executed, and the speed of the lower flexible member 13 is reduced, for example always by a value a, fixed or variable, or any other suitable value. If the absorbed current is equal to or less than the threshold (I≤IMax), a minimum current check is performed (block 105). Here, the current I absorbed by the first electric motor 16 is compared with a minimum threshold value IDes. If I≤IDes, the speed of the lower flexible member is increased in block 106. If the absorbed current is greater than IDes, no correction is performed and control returns to block 107.

Figure 7:
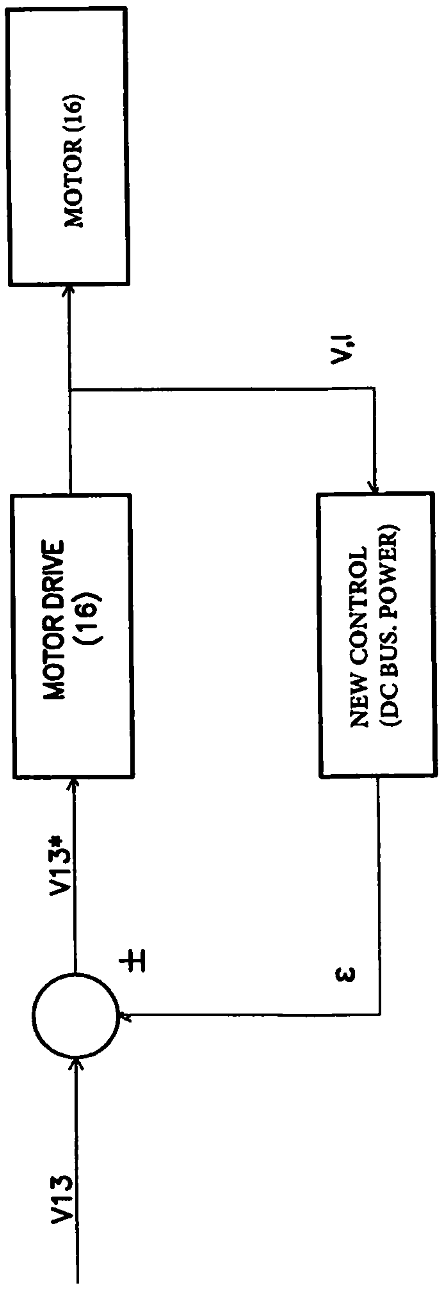
FIG. 7 a functional block diagram of the control of the lower flexible member motor.

FIG. 7 shows the functional block diagram of the control described above.

It is clear that what described above constitutes a possible embodiment. Those skilled in the art will appreciate that many modifications, changes and omissions are possible without departing from the spirit and scope of the claims.

What is claimed is:

1. Double facer for producing corrugated board, comprising:
- a heating section comprising a series of hot plates arranged in sequence along a path for advancement of a continuous strip of corrugated board;
- a cold traction section, located downstream of the heating section;
- an upper flexible member extending along the heating section and along the cold traction section;
- a lower flexible member extending downstream of the heating section along the cold traction section; wherein the upper flexible member and the lower flexible member are pressed towards each other to hold therebetween and pull the continuous strip of corrugated board along the path for advancement;
- a first electric motor adapted to drive the lower flexible member;
- a second electric motor adapted to drive the upper flexible member;
- pressure members adapted to press the upper flexible member against the hot plates;
- a control unit programmed to perform steps comprising:
  - a) pulling the corrugated board along the hot plates by the upper flexible member and the lower flexible member;
  - b) checking at least a first electric parameter of at least one of said first electric motor and said second electric motor, and modifying the speed of the at least one of said first electric motor and said second electric motor with respect to the speed of the other of said first electric motor and said second electric motor depending on at least said first electric parameter, to maintain a predetermined ratio between the speed of the upper flexible member and the speed of the lower flexible member within a predetermined range.

2. The double facer of claim 1, wherein the control unit is further programmed to perform the checking of the at least the first electric parameter repeatedly in an iterative manner to modify the speed of said at least one of said first electric motor and said second electric motor in real time.

3. The double facer of claim 1, wherein the control unit is further programmed to perform the modifying of the speed of the at least one of said first electric motor and said second electric motor by at least modifying the speed of the first electric motor.

4. The double facer of claim 1, wherein said first electric parameter programmed in said control unit is of the first electric motor.

5. The double facer of claim 4, wherein said first electric parameter programmed in said control unit is a function of the power absorbed by the first electric motor.

6. The double facer of claim 1, wherein said control unit is further programmed to perform steps of:
- comparing the first electric parameter of said at least one of said first electric motor and said second electric motor with a maximum admissible value of said first electric parameter;
- when the first electric parameter is greater than the maximum admissible value of said first electric parameter, reducing advancement speed of the lower flexible member with respect to advancement speed of the upper flexible member.

7. The double facer of claim 6, wherein said control unit is further programmed to perform steps as follows:
- when the first electric parameter of said at least one first electric motor and said second electric motor is equal to or less than the maximum admissible value of said first electric parameter, comparing the first electric parameter with a minimum admissible value of said first electric parameter;
- when the first parameter is lower than the minimum admissible value of said first electric parameter, increasing the speed of the lower flexible member with respect to the speed of the upper flexible member.

8. The double facer of claim 1, wherein said control unit is further programmed to perform steps of:

verifying whether the speed of the lower flexible member is less than the speed of the upper flexible member;

when the speed of the lower flexible member is less than the speed of the upper flexible member, modifying the speed of the lower flexible member and the speed of the upper flexible member with respect to each other until the speed of the lower flexible member becomes equal to or greater than the speed of the upper flexible member.

9. The double facer of claim 8, wherein the verifying programmed in said control unit of whether the speed of the lower flexible member is less than the speed of the upper flexible member comprises verifying whether the first electric motor works in electric generator mode.

10. The double facer of claim 9, wherein the verifying programmed in said control unit of whether the first electric motor operates in an electric generator mode comprises detecting a second electric parameter, said second electric parameter being a DC Bus voltage of the drive of the first electric motor.

* * * * *